(12) United States Patent
Ducher

(10) Patent No.: US 12,617,271 B2
(45) Date of Patent: May 5, 2026

(54) TRANSPORT REFRIGERATION SYSTEM

(71) Applicant: Carrier Corporation, Palm Beach Gardens, FL (US)

(72) Inventor: Gaël Ducher, Olivet (FR)

(73) Assignee: CARRIER CORPORATION, Palm Beach Gardens, FL (US)

( * ) Notice: Subject to any disclaimer, the term of this patent is extended or adjusted under 35 U.S.C. 154(b) by 576 days.

(21) Appl. No.: 18/149,374

(22) Filed: Jan. 3, 2023

(65) Prior Publication Data

US 2023/0211658 A1 Jul. 6, 2023

(30) Foreign Application Priority Data

Jan. 4, 2022 (EP) .................................... 22150206

(51) Int. Cl.
B60K 25/08 (2006.01)
B60P 3/20 (2006.01)

(52) U.S. Cl.
CPC ............... B60K 25/08 (2013.01); B60P 3/20 (2013.01); *B60Y 2200/148* (2013.01)

(58) Field of Classification Search
CPC ..... B60K 25/08; B60P 3/20; B60Y 2200/148; B60Y 2200/147; B60L 1/02; B60L 50/61; B60L 2200/36; B60L 2240/36; B60L 2240/423; B60H 1/3232; B60H 1/00428; B60H 1/32; Y02T 10/88; B60R 16/0307; H02K 5/24; H02K 7/1807
See application file for complete search history.

(56) References Cited

U.S. PATENT DOCUMENTS

| | | | |
|---|---|---|---|
| 4,405,032 A | 9/1983 | Welschof et al. | |
| 5,214,975 A | 6/1993 | Zalewski | |
| 5,564,981 A | 10/1996 | Iwabuchi et al. | |
| 5,921,334 A * | 7/1999 | Al-Dokhi ................. B60L 8/00 |
| | | | 180/2.2 |

(Continued)

FOREIGN PATENT DOCUMENTS

| | | |
|---|---|---|
| CN | 205001403 U | 1/2016 |
| CN | 211530966 U | 1/2016 |

(Continued)

OTHER PUBLICATIONS

European Search Report for Application No. 22150206.5; Issued Jul. 4, 2022; 9 Pages.

*Primary Examiner* — Drew J Brown
(74) *Attorney, Agent, or Firm* — CANTOR COLBURN LLP

(57) ABSTRACT

A transport refrigeration system (1) includes a transportation refrigeration unit (37); a generator (11) connected to a wheel axle (7A) of the transport refrigeration system (1), the wheel axle (7A) being coupled to a wheel (5), wherein the generator (11) is configured to be driven to generate electricity by rotation of the wheel axle (7A) and to supply that electricity to the transportation refrigeration unit (37); and a damper (23) connected to the wheel axle (7A) between the wheel (5) and the generator (11). Short spikes or pulsations in torque along the wheel axle (7A) resulting from, e.g., harsh braking or wheel blocking can be, dampened, either wholly or partly, by the damper (23) such that damage to the transport refrigeration system (1) can be avoided.

15 Claims, 6 Drawing Sheets

(56) References Cited

U.S. PATENT DOCUMENTS

| | | | |
|---|---|---|---|
| 7,452,281 B2 | 11/2008 | Nosaka et al. | |
| 7,931,538 B2 | 4/2011 | Martinek et al. | |
| 9,574,616 B2 | 2/2017 | Hakamata | |
| 10,023,049 B2 | 7/2018 | Nishimura et al. | |
| 10,513,180 B2 | 12/2019 | Quill | |
| 11,577,606 B1 * | 2/2023 | Macaluso | B60K 25/08 |
| 12,103,416 B2 * | 10/2024 | Macaluso | B60K 1/04 |
| 2008/0283322 A1 | 11/2008 | Gruber et al. | |
| 2020/0086849 A1 * | 3/2020 | Colavincenzo | B60L 1/02 |
| 2021/0025462 A1 | 1/2021 | Sakuraba et al. | |
| 2023/0392543 A1 * | 12/2023 | Colavincenzo | B60L 1/02 |

FOREIGN PATENT DOCUMENTS

| | | | | |
|---|---|---|---|---|
| CN | 114379374 A | * | 4/2022 | B60T 8/176 |
| DE | 864337 C | | 1/1953 | |
| DE | 102012219845 A1 | | 4/2014 | |
| DE | 102008059082 A1 | | 1/2016 | |
| DE | 202020104269 U1 | | 9/2020 | |
| EP | 1649195 B1 | | 6/2007 | |
| EP | 2112002 A2 | | 6/2007 | |
| EP | 2140174 B1 | | 6/2007 | |
| EP | 2173609 B1 | | 6/2007 | |
| EP | 2951453 B1 | | 6/2007 | |
| EP | 1488122 B1 | | 3/2014 | |
| EP | 3427992 A1 | | 1/2019 | |
| ES | 2329977 T3 | * | 12/2009 | B60K 6/365 |
| JP | 4003370 B2 | | 8/2007 | |
| JP | 5941684 B2 | | 6/2016 | |
| WO | 2010133863 A2 | | 11/2010 | |
| WO | 2019163391 A1 | | 8/2019 | |

* cited by examiner

211

209

207

205

TRANSPORT REFRIGERATION SYSTEM

FOREIGN PRIORITY

This application claims priority to European Patent Application No. 22150206.5, filed Jan. 4, 2022, and all the benefits accruing therefrom under 35 U.S.C. § 119, the contents of which in its entirety are herein incorporated by reference.

TECHNICAL FIELD OF INVENTION

The invention relates to a transport refrigeration system and a method of assembling the same.

BACKGROUND OF THE INVENTION

Typically, cold chain distribution systems are used to transport and distribute cargo, or more specifically perishable goods and environmentally sensitive goods (herein referred to as perishable goods) that may be susceptible to temperature, humidity, and other environmental factors. Perishable goods may include but are not limited to fruits, vegetables, grains, beans, nuts, eggs, dairy, seed, flowers, meat, poultry, fish, ice, and pharmaceuticals. Advantageously, cold chain distribution systems allow perishable goods to be effectively transported and distributed without damage or other undesirable effects.

Refrigerated vehicles and trailers are commonly used to transport perishable goods in a cold chain distribution system.

Conventionally, transport refrigeration systems (such as refrigerated vehicles and refrigerated trailers) include a transportation refrigeration unit. Such transport refrigeration units may comprise a refrigerant compressor, a condenser with one or more associated condenser fans, an expansion device, and an evaporator with one or more associated evaporator fans, which are connected via appropriate refrigerant lines in a closed refrigerant flow circuit. The transport refrigeration unit is mounted to the vehicle or to the trailer in operative association with a cargo space defined within the vehicle or trailer for maintaining a controlled temperature environment within the cargo space. Air or an air/gas mixture is drawn from the interior volume of the cargo space by means of the evaporator fan(s) associated with the evaporator, passed through the airside of the evaporator in heat exchange relationship with refrigerant whereby the refrigerant absorbs heat from the air, thereby cooling the air. The cooled air is then supplied back to the cargo space.

On commercially available transport refrigeration systems such as refrigerated vehicles and refrigerated trailers, the compressor, and typically other components of the transportation refrigeration unit, are typically powered during transit by an electric motor. In transport refrigeration systems that are electrically driven, a prime mover of the transport refrigeration system drives a generator that generates power. The generated power can be used to power the electric motor for driving the refrigerant compressor of the transportation refrigeration unit and also can be used for powering electric fan motors, for driving the condenser and evaporator motors, and for powering electric heaters associated with the evaporator.

A first known type of electrically driven transport refrigeration system involves rigidly coupling a wheel axle of the transport refrigeration system to a generator (of the rotational type) to generate electrical power. This arrangement is shown in FIGS. 2 and 3. As shown, a wheel axle 207 of a wheel 205 of a transport refrigeration system is coupled to a gearbox 209, which in turn is coupled to a generator 211. Rotation of the wheel axle 207 causes, via the gearbox 209, the generator 211 to be driven into rotation to create electricity. This electricity can then be supplied to a transportation refrigeration unit of the transport refrigeration system.

An enlarged view of the wheel 205, wheel axle 207 and gearbox 209 can be seen in FIG. 3. As shown in FIG. 3, the wheel 205 comprises a rim 215 with a tyre 213 situated thereon. The wheel 205 is connected to the wheel axle 207 via a rigid coupler 223 that attaches to a splined circumferential surface 221 at a first, distal end of the wheel axle 207. The coupler 223 is bolted to the rim 215 with coupler bolts 219. The rim 215 is additionally bolted to an axle hub 225 via rim bolts 217. The axle hub 225 supports an axle hub bearing 227 which permits relative rotation of the wheel 205 relative to the trailer axle 229. The trailer axle 229 concentrically houses part of the wheel axle 207. The second, proximal end of the wheel axle 207 is coupled to the gearbox 209 such that its rotation generates rotation within the gearbox 209 that in turn is transferred to the generator (not shown) for the generation of electricity. The second end of the wheel axle 207 is supported within the gearbox 209 and permitted to rotate by a gearbox bearing 208.

Improved transport refrigeration systems of the electrically driven type are desired.

SUMMARY OF THE INVENTION

In accordance with a first aspect of the invention, there is provided a transport refrigeration system comprising: a transportation refrigeration unit; a generator connected to a wheel axle of the transport refrigeration system, the wheel axle being coupled to a wheel, wherein the generator is configured to be driven to generate electricity by rotation of the wheel axle and to supply that electricity to the transportation refrigeration unit; and a damper connected to the wheel axle between the wheel and the generator.

The invention of the first aspect is advantageous since the damper acts (i.e. is configured) to absorb, deaden, dampen and/or depress torque supplied along the wheel axle from the generator and/or optional gearbox (more on this feature below) to the wheel of the wheel axle and vice versa. Specifically, short spikes or pulsations in torque (i.e. a significant sudden increase in torque) can be absorbed, deadened, dampened and/or depressed, either wholly or partly, by the damper of the first aspect of the invention. Such spikes/pulsations in torque may result from harsh braking, harsh acceleration, slippage between components and/or blocking of the wheel, the generator and/or the optional gearbox.

These torque spikes, in absence of a damper as in the first aspect, may result in damage and failure of components of the transport refrigeration system, in particular the wheel axle. Thus, the presence of the damper avoids, or at the very least reduces the likelihood of, damage to the components of the transport refrigeration system. Thus damage to the wheel, wheel axle and/or generator that may otherwise result from an overload (i.e. a short, sharp increase in torque) can be avoided by the invention the first aspect.

This same advantageous effect is not achievable with, e.g., the first known type of electrically driven transport refrigeration system discussed above with reference to FIGS. 2 and 3. This is because a rigid connection (i.e. via rigid coupler 223) is provided along the wheel axle 207 between the wheel 205 and the generator 211 and no damping is provided. As such, the damage to the wheel axle 207, generator 211 and/or wheel 205 is likely in the event of a spike or pulsation of torque. The wheel axle 207 is particularly susceptible to damage at the portion denoted by reference sign 207a in FIG. 3, which is particularly disadvantageous since the wheel axle 207 is a costly (approximately 1000 USD) component.

The damper of the first aspect of the invention also results in reduced vibrational feedback from the wheel to the generator (and vice versa) as compared to, e.g., the arrangement depicted in FIG. 2 which is absent a damper. In that way the impact that vibrations from, e.g., uneven road surface have on the performance of the generator can be reduced.

It will be understood by the skilled person that the damper will be configured to reduce the amount of (kinetic) energy in the system of the first aspect of the invention. The damper may be a mechanical damper and may use mechanical means to provide the damping effect.

The damper may comprise a flexible material which is configured to deflect/deform in order to absorb, deaden, dampen and/or depress torque spikes/pulsations. The flexible material may be an elastomeric material, e.g. rubber.

The damper may act (i.e. may be configured) to absorb, deaden, dampen and/or depress torque exceeding a threshold torque. Thus, the dampening, absorption, deadening and/or depression may only occur when a torque spike/pulsation exceeds the threshold value. As such, there may be no absorption, deadening, dampening and/or depression of torque below the threshold torque. The threshold value of the damper may be selected/set such that only torque spikes/pulsations that would cause damage to the transport refrigeration system or components thereof (e.g. the wheel, the wheel axle, the generator and/or the optional gearbox) are absorbed, damped, deadened, depressed. Equally, the threshold torque may be selected/set such that there is no damping, absorption, deadening and/or depression of torque that is small enough such that it would not result in damage to the transport refrigeration system or components thereof. Where the damper comprises a flexible material, the flexible material of the damper may only be configured to deform/deflect only above a threshold torque.

The threshold torque may be of the order of magnitude of 103 Nm-105 Nm. This torque range is sufficiently large such that the damper would not inhibit the performance of the normal functioning of the transport refrigeration system and would only absorb torque that is likely to cause damage to the transport refrigeration system or components thereof.

The damper may be provided in-line with the wheel axle. That is, the damper may be aligned with the wheel axle. For example, the damper may be aligned/in-line with a primary, rotational axis of the wheel axle. As a further example, a central axis of the damper may be aligned with the wheel axle (e.g. the primary, rotational axis of the wheel axle).

The damper, wheel axle, the wheel, the generator, and the optional gearbox may be connected in series (not necessarily in that particular order) with regards to torque supplied along them.

A damper that that is not aligned/in-line with the wheel axle is one that is offset from the wheel axle, for example offset from the primary, rotational axis of the wheel axle.

The damper may be arranged such that rotation of the wheel axle results in a correspondent or substantially correspondent rotation in the damper. This is particularly the case, when the damper is provided in-line/aligned with the wheel axle The wheel may be coupled at a first end of the wheel axle with the generator being connected to a second end of the wheel axle. The damper may be provided at a location anywhere between the first and second ends of the wheel axle.

The damper may be provided at a coupling point of the wheel and the wheel axle. That is, the coupling/connection between the wheel and the wheel axle may comprise the damper and may thus be considered a damped coupling and/or a flexible coupling. The damper may alternatively be provided in a different location, e.g. at the connection between the wheel axle and the generator. Alternatively, the wheel axle may comprise a first axle section and a second axle section. The damper may be provided at the connection between the first axle section and the second axle section such that the damper transfers torque between the first and second axle sections.

The damper may be a unitary, modular component/piece. As such, the damper may be integrable into already existent transport refrigeration system with little to no modification required. The damper may thus be easily retrofitted to an existent transport refrigeration system so as to bring the transport refrigeration system into accordance with the first aspect of the invention, including any option features thereof. The modularity of the damper may also result in its easy replaceability.

The wheel of the transport refrigeration system may be a primary load bearing wheel of the transport refrigeration system. A primary load bearing wheel may be a wheel that is configured for supporting the transport refrigeration system on the ground and/or configured to enable motion of the transport refrigeration system along the ground.

The transport refrigeration system may comprise an electrical energy storage device (e.g. one or more batteries) connected to the generator and to the transportation refrigeration unit, the electrical energy storage device being configured to receive and store electrical energy from the generator and to provide electrical power to the transportation refrigeration unit. The electrical energy storage device may thus act as an intermediary between the generator and the transportation refrigeration unit, and may ensure a near constant provision of electrical power to the transportation refrigeration unit when the supply from the generator may not be constant. Where an energy storage device is provided, the supply of electricity to the transportation refrigeration unit from the generator may be considered an indirect supply (since it passes through an intermediary).

The transport refrigeration system may comprise power electronic components configured to filter the electricity generated at the generator prior to its supply to the refrigeration unit. Filtering by the power electronic components may be necessary where the electricity output from the generator is not in a form readily usable by the refrigeration unit. The power electronic components may be comprised as part of the energy storage device, if present, or the transportation refrigeration unit.

The transport refrigeration system may comprise a gearbox coupled between the wheel axle and the generator. The gearbox may be used to ensure that the generator is driven at, or as close to as possible, a desired speed (e.g. for improved efficiency of electricity generation), and that the speed at which the generator is driven is not solely dictated by the rotation speed of the wheel axle.

Blockages in gearboxes can be common due to failure of the components of the gearbox, leakage of lubricant or otherwise. As such, the invention of the first aspect is particularly advantageous in scenarios where an optional gearbox is provided since damping of the torque spike/pulsation resulting from gearbox blockage can be absorbed by the damper and thus the damage that would otherwise be caused by this blockage can be avoided.

The transport refrigeration system may comprise a generator controller configured to control operation and performance of the generator/and or gearbox. The generator controller may be configured to receive information regarding the operating conditions of the generator and to control the operating performance or parameters of the generator and/or gearbox responsive to this information. The generator controller may be configured to control the generator and/or gearbox to ensure optimised efficiency of electrical power generation. The generator controller may be comprised as part of the energy storage device.

The generator may be a rotating generator. The rotational axis of the generator may be aligned with or offset from the wheel axle.

The transport refrigeration system may be a refrigerated vehicle or a refrigerated trailer. The transportation refrigeration unit may be mounted to the refrigerated vehicle or to the trailer.

The transport refrigeration system may be or may be comprised as part of a heavy goods vehicle (HGV). For example, the transport system may itself be a heavy goods vehicle or may be a trailer of a heavy goods vehicle. Alternatively, the transport refrigeration system may be or may be comprised as part of a light goods vehicle (LGV). The invention of the first aspect is particularly advantageous in the context of larger vehicles, e.g. HGV and LGV. This is because the size and mass of the components in such vehicles, in particular the size and mass of the wheel, wheel axle and generator, are sufficiently large and massive that the torque spikes/pulsations resulting from these components due to harsh braking, harsh acceleration, slippage between these components and/or blocking of these components are large enough that there is a real and significant risk of damage to these components in absence of a damper.

The transportation refrigeration unit may be in operative association with a cargo space defined within the transport refrigeration system (e.g. within the vehicle or trailer) and for maintaining a controlled temperature environment within the cargo space.

The transportation refrigeration unit may comprise a refrigerant compressor, a condenser, one or more condenser fans, an expansion device, an evaporator, and/or one or more associated evaporator fans. Any of these components, if present, may be connected by appropriate refrigerant lines in a closed refrigerant flow circuit.

The transportation refrigeration unit may comprise an electric motor connected to the generator or the energy storage device. The electric motor may be configured to convert the electricity produced at the generator or supplied from the energy storage device into kinetic energy. The kinetic energy produced may be used to drive components of the transportation refrigeration unit, e.g. the compressor.

The damper may be positioned along the wheel axle between the first wheel and a second wheel of the transportation refrigeration system, the second wheel being paired with the first wheel such that the first and second wheel provide a paired support for the transport refrigeration system.

For example, the transport refrigeration system may comprise a second wheel coupled to the wheel axle at an end of the wheel axle that is opposed from the location that the first wheel is at. The damper may also act (i.e. is configured) to absorb, deaden, dampen and/or depress torque supplied along the wheel axle from the generator and/or optional gearbox to the second wheel of the wheel axle and vice versa. An additional, (second) damper may also be provided along the wheel axle between the first wheel and the second wheel to absorb, deaden, dampen and/or depress torque supplied along the wheel axle from the generator and/or optional gearbox to the second wheel (and the first wheel) of the wheel axle and vice versa.

Alternatively, the transport refrigeration system may comprise a second wheel axle coupled to a second wheel. The second wheel axle may be connected to the generator. The generator may be configured to be driven to generate electricity by rotation of the second wheel axle and to supply that electricity to the transportation refrigeration unit (i.e. in addition to its configuration to generate electricity by rotation of the first wheel axle). The transport refrigeration system may comprise a second damper connected to the second wheel axle between the second wheel and the generator (and thereby also located between the (first) wheel and the second wheel). The second wheel axle may be aligned with the (first) wheel axle such the (first) wheel and the second wheel form a pair of wheels for the transport refrigeration system.

The second wheel axle may be connected to the same gearbox that the first wheel axle is optionally connected to or a different gearbox to the (first) wheel axle. The different gearbox may correspond to the gearbox to which the first wheel axle is optionally connected to.

The second wheel axle may, whilst making the necessary modifications, correspond to the (first) wheel axle as described herein, optionally inclusive of any optionally features thereof. Additionally, and/or alternatively the second wheel may, whilst making the necessary modifications, correspond to the (first) wheel as described herein, optionally inclusive of any optionally features thereof. The second damper may, whilst making the necessary modifications thereto, correspond to the first damper, optionally inclusive of any optional features thereof.

The transport refrigeration system may comprise a differential. The differential may be connected to the first wheel axle and to the second wheel axle and may permit differential rotation between the first and second wheel axles. The differential may be connected between the first wheel axle and the optional gearbox or generator and may be connected between the second wheel axle and the optional gearbox or generator.

In a second aspect of the invention, there is provided a cold chain distribution system comprising at least one transport refrigeration system in accordance with the first aspect of the invention, optionally incorporating any optional features of the first aspect of the invention.

In a third aspect of the invention, there is provided a method of assembling a transport refrigeration system. The method comprises providing a transportation refrigeration unit; connecting a damper to a wheel axle of the transport refrigeration system, wherein the wheel axle is coupled to a wheel; connecting a generator to the wheel axle such that the generator is configured to be driven to generate electricity by rotation of the wheel axle; and connecting the generator to the transportation refrigeration unit such that the generator is configured to supply electricity to the transportation refrigeration unit; wherein the damper is connected to the wheel axle between the wheel and the generator.

The method of the third aspect of the invention may result in the assembly of the transport refrigeration system of the first aspect of the invention, optionally including any optional features thereof.

In a fourth aspect, the invention provides a method of retrofitting a transport refrigeration system comprising: a transportation refrigeration unit; a generator connected to a wheel axle of the transport refrigeration system, the wheel axle being coupled to a wheel, wherein the generator is configured to be driven to generate electricity by rotation of the wheel axle and to supply that electricity to the transportation refrigeration unit; the method comprising connecting a damper to the wheel axle between the wheel and the generator.

The method of the fourth aspect of the invention may result in the transport refrigeration system of the first aspect of the invention, optionally including any optional features thereof.

BRIEF DESCRIPTION OF THE DRAWINGS

Certain preferred embodiments of the invention will now be described, by way of example only, and with reference to the accompanying drawings, in which.

DETAILED DESCRIPTION OF THE INVENTION

Figure 1:
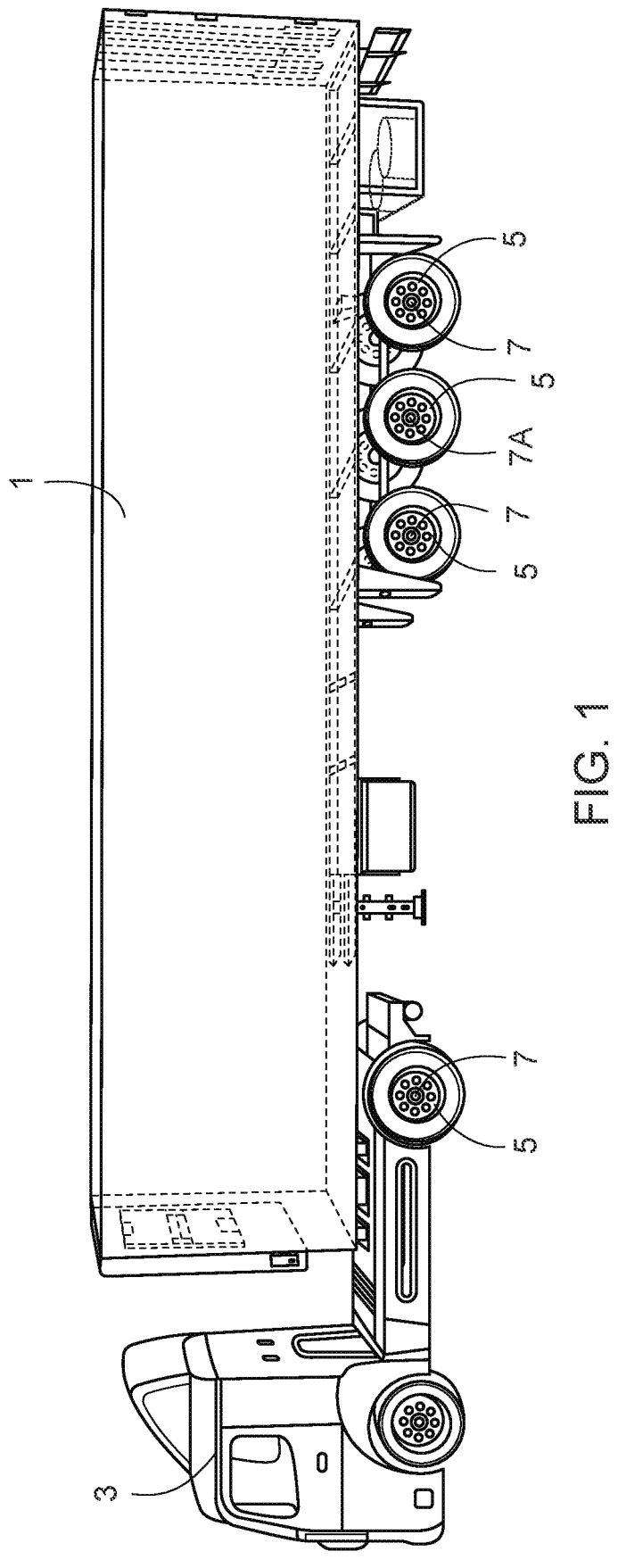
FIG. 1 shows a transport refrigeration system.
Figure 2:
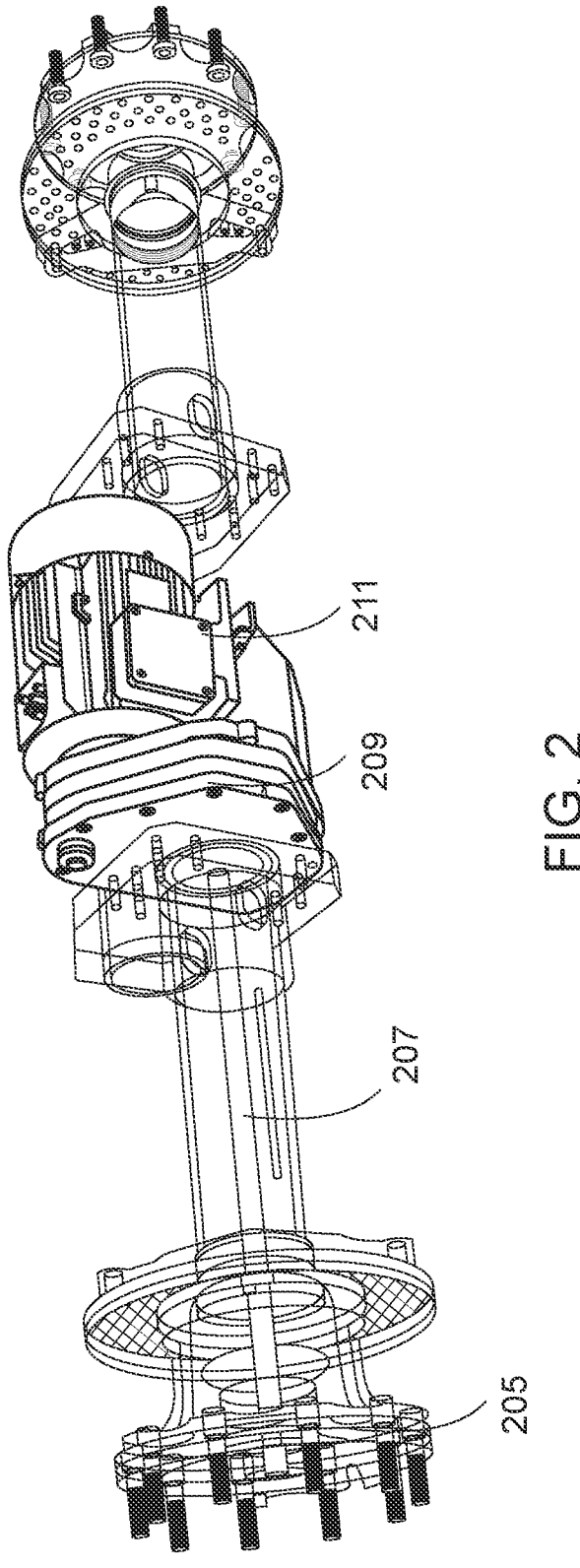
FIG. 2 shows components of a prior art transport refrigeration system.

FIG. 1 shows a transport refrigeration system 1 in the form of a refrigerated trailer 1. The refrigerated trailer 1 is attached to a tractor unit 3 and together they form a heavy goods vehicle (HGV). The trailer 1 comprises a transportation refrigeration unit (not shown) in operative association with a cargo space defined within the trailer 1 and for maintaining a controlled temperature environment within the cargo space of the trailer 1.

The trailer 1 comprises a plurality of wheels 5, each connected to a respective wheel axle 7, 7A. As described in more detail below with reference to FIG. 4, a generator via a gearbox is coupled to the wheel axle 7A of the trailer 1. The generator is coupled to the wheel axle 7A and generates electricity in response to the rotation of the wheel axle 7A. This electricity is then configured to be supplied to the transportation refrigeration unit of the trailer 1 to power its components.

Figure 4:
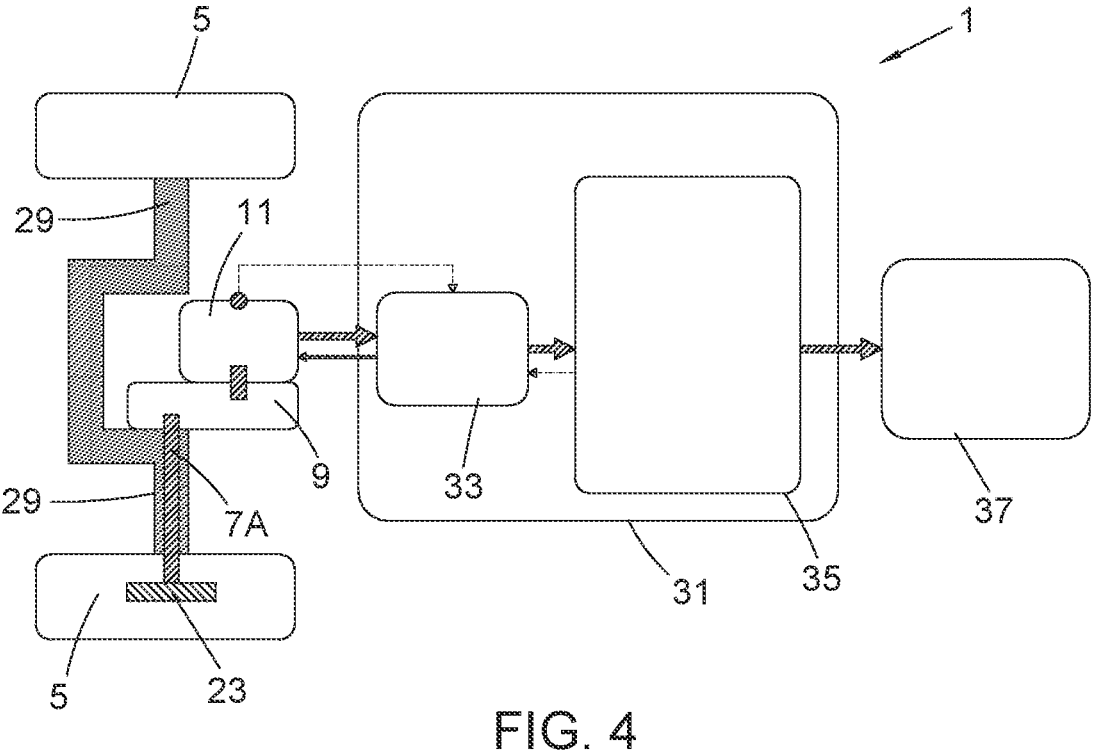
FIG. 4 shows a schematic of the transport refrigeration system of FIG. 1.

FIG. 4 shows a schematic of various components of the refrigerated trailer 1 of FIG. 1. In particular, the wheel 5 coupled to the wheel axle 7A is shown. The wheel axle 7A is largely housed (i.e. concentrically surrounded) within a trailer axle 29. The trailer axle 29 extends to an opposed side of the trailer 1 and rotatably supports a second wheel 5 paired with the first wheel 5.

An axial end of the wheel axle 7A is rotationally coupled to a gearbox 9, the gearbox 9 in turn being rotationally coupled to a generator 11. As such, the rotational output of the gearbox 9, which is created as a result of rotation of the wheel axle 7A which in turn is created by rotation of the wheel 5 coupled to the axle 7A, drives the generator 11 into rotation to thereby generate electricity.

An output of the generator 11 is electrically coupled to an energy storage device 31 in the form of a battery pack 31.

The electrical power produced at the generator 11 is configured to be transferred to the battery pack 31 for storage via this output.

The battery pack 31 comprises a generator controller 33. The generator controller 33 is in communication with the generator 11 and is configured to receive information regarding the operating conditions of the generator 11 (e.g. rotational speed). Based on this information, the generator controller 33 can control operating parameters or conditions of the gearbox 9 and the generator 11 to ensure optimised efficiency of electrical power generation.

The battery pack 31 further comprises power electronic components 35. The power electronic components 35 have an output connected to the transportation refrigeration unit 37 of the trailer. The power electronic components 35 act as an intermediary between the electrical power stored in the battery pack 31 and the transportation refrigeration unit 37. As such, all power supplied from the battery pack 31 to the transportation refrigeration unit 37 passes via the power electronic components 35 which are configured to filter the electrical power prior to its supply to the transportation refrigeration unit 37 such that it is in form usable by the transportation refrigeration unit 37.

The other axial end of the wheel axle 7A is coupled to the wheel 5 via a damped, flexible coupler 23 that is provided in-line with the wheel axle 7A. Further details of the connection between the wheel 5 and the wheel axle 7A via the damped coupler 23 are shown in FIG. 6 which is a comparable schematic to that of FIG. 3 that represents the prior art.

Figure 6:
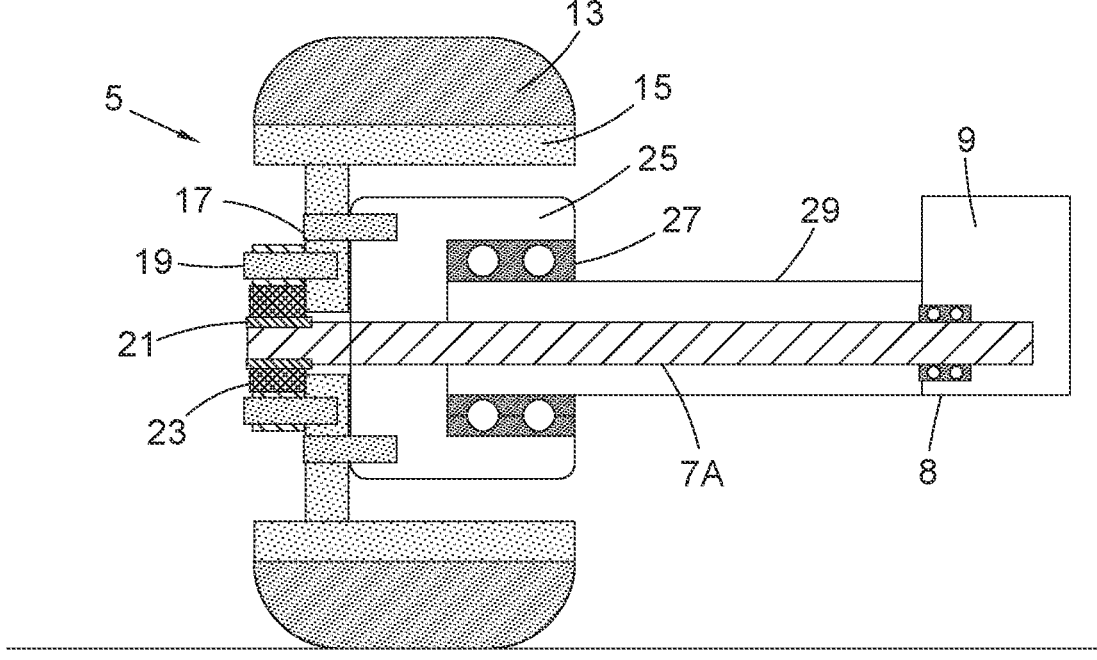
FIG. 6 shows a schematic of a wheel and wheel axle of a transport refrigeration system.

In FIG. 6 it can be seen that the damped coupler 23 is attached to a splined circumferential surface 21 at the axial end of the wheel axle 7A. The damped coupler 23 is bolted to a rim 15 of the wheel 5 with coupler bolts 19. The rim 15 is additionally bolted to an axle hub 25 via rim bolts 17. The axle hub 25 supports an axle hub bearing 27 which permits relative rotation of the wheel 5 relative to the trailer axle 29.

Also shown in FIG. 6 is that the wheel axle 7A is supported within the gearbox 9 and permitted to rotate by a gearbox bearing 8.

During normal operation, as the trailer 1 is moved in transit, the wheels 5 of the trailer 1 are driven into rotation. This in turn drives the shaft 7A into rotation since it is coupled to one of the wheels 5. The rotation of the shaft 7A is translated via the gearbox 9 to the generator 11 where electrical power is generated. This electrical power is then transferred to the battery pack 31 for storage. Electrical power is then supplied from the battery pack 31, via the power electronic components 35 where the electrical power is appropriately filtered, to the transportation refrigeration unit 37 as required for powering the components thereof.

During transit an event may occur which creates a large spike or pulsation of torque along the wheel axle 7A, which may originate from the wheel 5 or from the gearbox 9 and/or the generator 11. This torque spike is a product of the large inertial forces associated with rotation of the gearbox 9 and generator 11, both of which are large components having a combined mass of hundreds of kilograms. For instance, if the trailer 1 undergoes a severe braking event (e.g. due to an emergency stop) or if the gearbox 9 were to suddenly block/fail, then a large torque spike would be transmitted along the wheel axle 7A. In the event of such a torque spike, the flexible coupler 23 deforms/deflects as a result in the increased torque along the wheel axle 7A to at least partially absorb/deaden/dampen the torque spike and thereby reduce the amount of torque resulting through the wheel axle 7A. In that way, damage or failure of the components of the trailer 1 (e.g. the wheel 5, wheel axle 7A, gearbox 9 and/or generator 11), in particular the wheel axle 7A, can be avoided.

Figure 3:
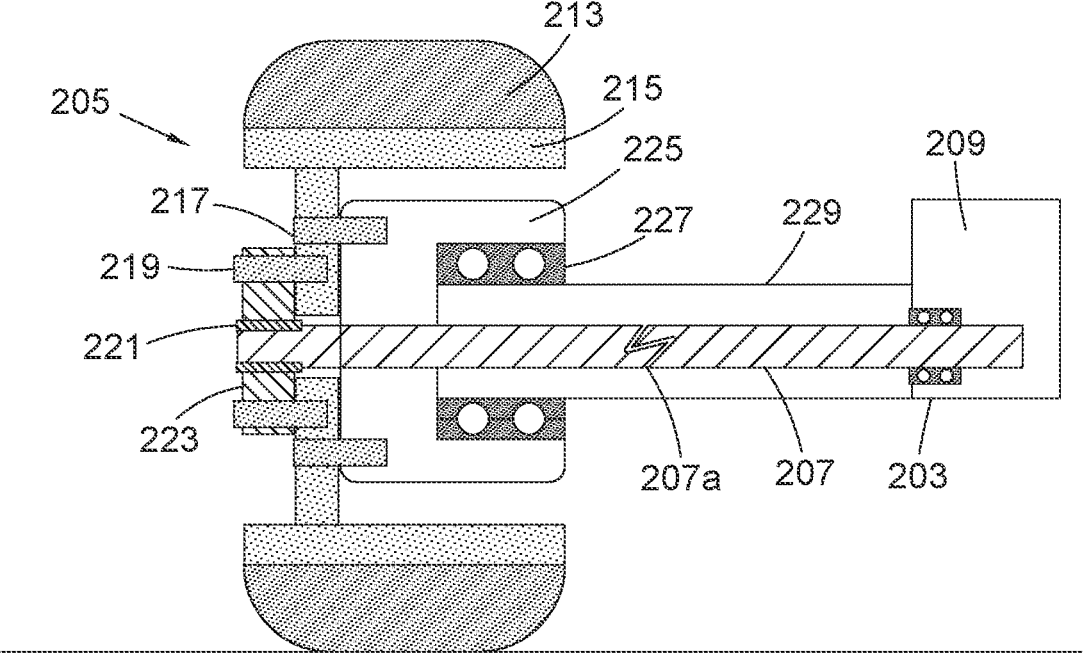
FIG. 3 shows a schematic of a wheel and wheel axle of prior art transport refrigeration system of FIG. 2
Figure 5:
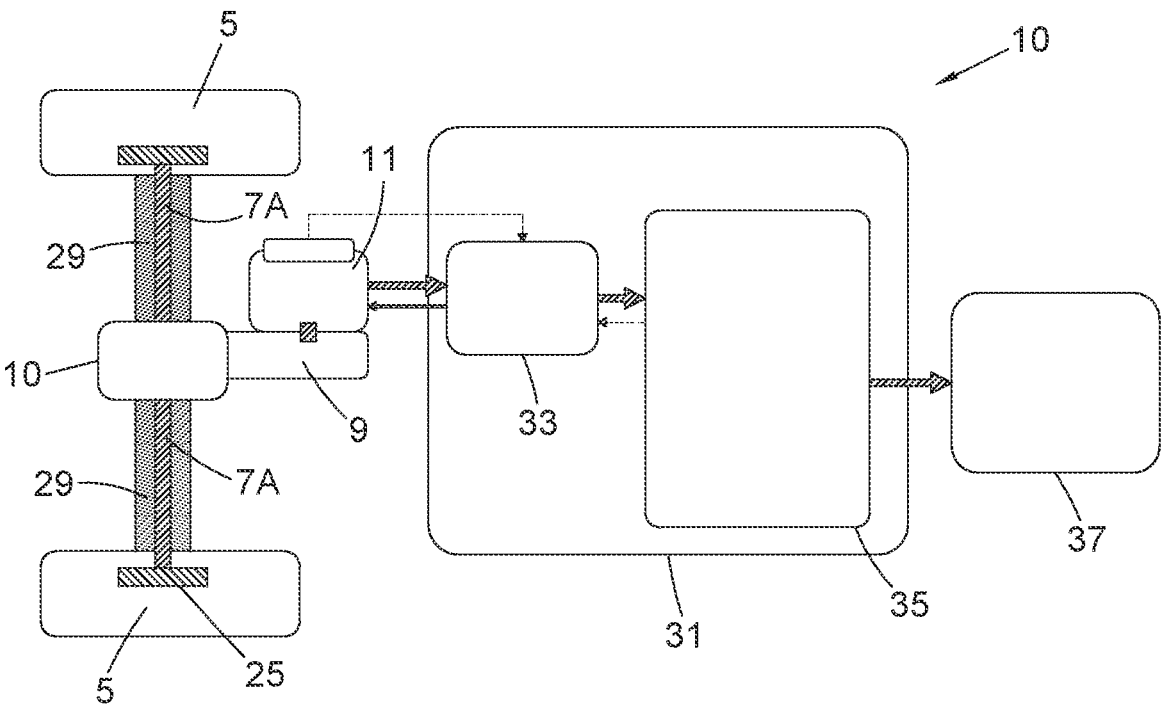
FIG. 5 shows a schematic of an alternative transport refrigeration system.

FIG. 5 shows a schematic of an alternative transport refrigeration system 10 which may be embodied as a trailer as for the transport refrigeration system 1 described in relation to FIGS. 1 and 3 above.

The features and functionality of the transport refrigeration system 10 of FIG. 5 are largely identical to those of the trailer 1 described above. As such, these correspondent features have been denoted with the same reference signs in FIG. 5 and a detailed description of these features will not be given again here.

The transport refrigeration system 10 of FIG. 5 differs from that described above in relation to FIGS. 1 and 4 in that a second wheel axle 7A is provided. The second wheel axle 7A is connected at an axial end to the second wheel 5 opposed to the first wheel 5 and rotationally coupled at its second axial end to a differential 10. The first wheel axle 7A is also coupled to the differential 10. The differential 10 in turn is rotationally coupled to the gearbox 9, which itself is coupled to the generator 1. As such, the rotational output from two wheel axles 7A (as opposed to one as in system of FIGS. 1 and 4) is used to drive electrical power generation at the generator 11, whereby the differential 10 permits the rotational output of the two wheel axles 7A to be combined and transferred to a single gearbox 9 and generator 11.

The transport refrigeration system 10 of FIG. 5 further differs from that described above in relation to FIGS. 1 and 4 in that a second damped coupler 23 is provided at the interface between the second wheel 5 and the second wheel axle 7A. In that way, torque spikes along the second wheel axle 7A can also be damped/absorbed/deadened and damage to components associated with this second side of the transport refrigeration system 10, in particular the second wheel axle 7A, can be avoided.

What is claimed is:

1. A transport refrigeration system (1, 10) comprising:
   a transportation refrigeration unit (37);
   a generator (11) connected to a wheel axle (7A) of the transport refrigeration system (1, 10), the wheel axle (7A) being coupled to a wheel (5), wherein the generator (11) is configured to be driven to generate electricity by rotation of the wheel axle (7A) and to supply that electricity to the transportation refrigeration unit (37); and
   a damper (23) connected to the wheel axle (7A) between the wheel (5) and the generator (11);
   wherein the damper is configured to dampen torque supplied along the wheel axle.

2. A transportation refrigeration system (1, 10) according to claim 1, comprising a gearbox (9) connected between the wheel axle (7A) and the generator (11).

3. A transport refrigeration system (1, 10) according to claim 1, wherein the damper comprises an elastomeric material.

4. A transport refrigeration system (1, 10) according to claim 1, wherein the damper is configured to only dampen torque exceeding a threshold torque.

5. A transport refrigeration system (1, 10) according to claim 4, wherein the threshold torque may be of the order of magnitude of 103 Nm-105 Nm.

6. A transport refrigeration system (1, 10) according to claim 4, wherein the threshold torque of the damper is set below a torque that would result in damage to the wheel axle (7A), generator (9) and/or wheel (5).

7. A transport refrigeration system (1, 10) according to claim 1, wherein the damper is provided at a coupling point of the wheel (5) and the wheel axle (7A).

8. A transport refrigeration system (1, 10) according to claim 1, wherein the damper (23) is a unitary, modular component.

9. A transport refrigeration system (1, 10) as claimed in claim 1, wherein the transport refrigeration system is or is comprised as part of a heavy goods vehicle (HGV) or a light goods vehicle (LGV).

10. A transport refrigeration system (1, 10) according to claim 1, comprising:
   a second wheel axle (7A) coupled to a second wheel (5), wherein the second wheel axle (7A) is connected to the generator (11) such that the generator (11) is configured to be driven to generate electricity by rotation of the second wheel axle (7A) and to supply that electricity to the transportation refrigeration unit (37): and
   a second damper (23) connected to the second wheel axle (7A) between the second wheel (5) and the generator (11).

11. A transport refrigeration system (1, 10) according to claim 1, wherein the damper (23) is in-line with the wheel axle (7A).

12. A cold chain distribution system comprising at least one transport refrigeration system (1) in accordance with claim 1.

13. A method of assembling a transport refrigeration system (1, 10) comprising:
   providing a transportation refrigeration unit (37);
   connecting a damper (23) to a wheel axle (7A) of the transport refrigeration system (1), wherein the wheel axle (7A) is coupled to a wheel (5);
   connecting a generator (11) to the wheel axle (7A) such that the generator (11) is configured to be driven to generate electricity by rotation of the wheel axle (7A); and
   connecting the generator (11) to the transportation refrigeration unit (37) such that the generator (11) is configured to supply electricity to the transportation refrigeration unit (37);
   wherein the damper (23) is connected to the wheel axle (7A) between the wheel (5) and the generator (9);
   wherein the damper is configured to dampen torque supplied along the wheel axle.

14. A method of retrofitting a transport refrigeration system (1, 10) comprising: a transportation refrigeration unit (37); a generator (11) connected to a wheel axle (7A) of the transport refrigeration system, the wheel axle being coupled to a wheel (5), wherein the generator is configured to be driven to generate electricity by rotation of the wheel axle and to supply that electricity to the transportation refrigeration unit; the method comprising connecting a damper (23) to the wheel axle between the wheel and the generator;
   wherein the damper is configured to dampen torque supplied along the wheel axle.

15. A transport refrigeration system (1, 10) according to claim 1, wherein the wheel is a primary load bearing wheel of the transport refrigeration system.

\* \* \* \* \*